United States Patent
Azuma (10) Patent No.: US 10,520,770 B2
(45) Date of Patent: Dec. 31, 2019

(54) DISPLAY APPARATUS

(71) Applicant: SAKAI DISPLAY PRODUCTS CORPORATION, Sakai-shi, Osaka (JP)

(72) Inventor: Hiroki Azuma, Sakai (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 261 days.

(21) Appl. No.: 15/597,750

(22) Filed: May 17, 2017

(65) Prior Publication Data

US 2017/0285406 A1   Oct. 5, 2017

Related U.S. Application Data

(63) Continuation of application No. PCT/JP2014/081219, filed on Nov. 26, 2014.

(51) Int. Cl.
*G02F 1/1335* (2006.01)
*G02B 6/00* (2006.01)
*F21V 8/00* (2006.01)

(52) U.S. Cl.
CPC ......... *G02F 1/133608* (2013.01); *G02B 6/00* (2013.01); *G02B 6/0088* (2013.01);
(Continued)

(58) Field of Classification Search
CPC ......... G02F 1/133608; G02F 1/133603; G02F 1/133605; G02F 1/133606; G02B 6/00; G02B 6/0088
(Continued)

(56) References Cited

U.S. PATENT DOCUMENTS 7,780,333 B2 *   8/2010   Hsu ................. G02F 1/133606
                                              349/58
8,031,289 B2 *  10/2011   Naritomi ........... G02F 1/133608
                                              349/58
(Continued)

FOREIGN PATENT DOCUMENTS

JP   2010-192301 A   9/2010
JP   2012-113873 A   6/2012
JP   2012-186076 A   9/2012

OTHER PUBLICATIONS

Int'l. Search Report issued in Int'l. App. No. PCT/JP2014/081219, dated Jan. 20, 2015.

*Primary Examiner* — Bryon T Gyllstrom
(74) *Attorney, Agent, or Firm* — Greer Burns & Crain Ltd.

(57) ABSTRACT

Provided is a display apparatus, including: a rectangular display panel including a screen in front; a rectangular sheet located behind the display panel, the sheet having a plurality of holes in a peripheral portion thereof; a light source illuminating the display panel with light from behind the display panel; and a housing accommodating the light source, the housing that has a generally box-like shape having a rectangular opening toward the display panel, and has a plurality of engageable portions arranged along a longitudinal direction in a peripheral portion of the rectangular opening, the plurality of engageable portions capable of engaging respectively with edges of the plurality of holes; wherein the plurality of engageable portions are adjustable in position or orientation so as to contact the edges of the plurality of holes.

8 Claims, 9 Drawing Sheets

(52) U.S. Cl.
CPC .. *G02F 1/133603* (2013.01); *G02F 1/133605* (2013.01); *G02F 1/133606* (2013.01); *G02F 1/133615* (2013.01)

(58) Field of Classification Search
USPC ........................................................ 362/97.1
See application file for complete search history.

(56) References Cited

U.S. PATENT DOCUMENTS

| | | | | |
|---|---|---|---|---|
| 8,388,161 | B2* | 3/2013 | Li | G02F 1/133608 362/632 |
| 8,485,693 | B2* | 7/2013 | Lee | G02B 6/009 362/312 |
| 2006/0028836 | A1* | 2/2006 | Shin | G02B 6/0088 362/600 |
| 2007/0127270 | A1* | 6/2007 | Chang | G02F 1/133608 362/633 |
| 2015/0338571 | A1* | 11/2015 | Jun | G02B 6/0088 362/97.1 |
| 2016/0195770 | A1* | 7/2016 | Fukai | G02B 5/02 362/97.1 |
| 2016/0202411 | A1* | 7/2016 | Kuromizu | G02F 1/133 362/606 |
| 2017/0153487 | A1* | 6/2017 | Kim | G02B 6/0055 |
| 2017/0205054 | A1* | 7/2017 | Li | F21V 17/101 |
| 2018/0299722 | A1* | 10/2018 | Ohtsubo | G02F 1/133308 |
| 2018/0307085 | A1* | 10/2018 | Sugimoto | G02F 1/133308 |

* cited by examiner

DISPLAY APPARATUS

This is a continuation of International Application No. PCT/JP2014/081219, with an international filing date of Nov. 26, 2014, the contents of which are hereby incorporated by reference.

BACKGROUND

1. Technical Field

The present invention relates to a display apparatus which includes a display panel including a screen in front, a sheet located behind the display panel and having a plurality of holes in a peripheral portion thereof, a light source illuminating the display panel with light from behind the display panel, and a housing accommodating the light source and having, in a peripheral portion thereof, a plurality of engageable portions capable of engaging respectively with the holes.

2. Description of the Related Art

A liquid crystal display apparatus as a display apparatus has features of being thin and consuming low electric power, and, for improved display quality thereof, has recently been spread as a display apparatus replacing a conventional CRT and also in wide use as an image display apparatus of a television receiver (hereinafter, referred to as a "TV receiver"). Unlike a self-light emitting device, a liquid crystal display apparatus requires a backlight unit as a light source, and displays an image by controlling the light transmittance determined by electro-optical characteristics of a liquid crystal material thereof.

The backlight unit is available in an edge type (side light type, light guide plate type) and a direct type.

One type of liquid crystal display apparatus, including an edge-type backlight unit, that is provided for the purpose of being thinner, being more lightweight and having a narrower frame includes a display module and a frame covering the display module. The display module includes a liquid crystal display panel (hereinafter, referred to as a "liquid crystal panel") and a backlight unit located on a rear surface of the liquid crystal panel. The backlight unit includes a rectangular box-shaped chassis (BL (backlight) chassis), and a light guide plate, an optical sheet and an LED (Light Emitting Diode) substrate accommodated in the BL chassis. The LED substrate includes a lengthy plate and a plurality of LEDs mounted on a flat surface of the lengthy plate. In the case where the backlight unit is of a one-side edge light type, which includes a light source facing one edge of the liquid crystal panel, the LED substrate is located on one of longer side surfaces of the light guide plate, which is rectangular. Light emitted from the LED and incident on the longer side surface of the light guide plate is output from a main surface of the light guide plate and illuminates the rear surface of the liquid crystal panel.

A direct-type backlight has the following structure. A plurality of LED substrates are provided on a bottom surface of the chassis. A reflector sheet is placed on the bottom surface such that a diffuser lens covering each of LEDs is exposed. A diffuser plate is located at a position slightly away from the diffuser lens toward an opening. An optical sheet is located above the diffuser plate.

In many display apparatuses of either type, a plurality of engageable portions are provided on a top side portion of an opening edge portion of the chassis, and the optical sheet has holes. The engageable portions are respectively put into engagement with edges of the holes, so that the optical sheet is suspended.

Japanese Laid-Open Patent Publication No. 2012-113873 (hereinafter "Patent Document 1") discloses the following invention relating to a backlight device. Engageable portions each having a circular planar shape are provided in a peripheral portion of a chassis, and a light guide film and an optical sheet each having a thickness of 1 mm or less each have elliptical holes slightly larger than the engageable portions. The engageable portions are respectively put into engagement with edges of the holes. With such a structure, the light guide film and the optical sheet are suspended from the chassis without sagging.

Recently, display apparatuses have been increased in size, and now tolerances are large, and opening edge portions of chasses are easier to be warped.

Due to such warp, error or the like, the engageable portions may not be aligned in a straight line and a part of the engageable portions may be deviated in position. In the meantime, the holes in the sheet are aligned in a straight line. Therefore, when the sheet is put on the opening edge portion of the chassis in a state where the engaged portion is deviated, there are engageable portions that are not in contact with top edges of the corresponding holes. In this case, the load of the sheet is concentrated on the engageable portions in contact with the edges of the corresponding holes. As a result, a problem that, for example, the sheet is ruptured or wobbled occurs.

In the backlight unit described in Patent Document 1 also, there may be engageable portions that are not engaged with the holes due to the warp, error or the like of the peripheral portion of the chassis. This causes the problem that the light guide film or the optical sheet may not be suspended from the peripheral portion.

SUMMARY

The present invention made in light of such a situation has an object of providing a display apparatus assembled with high precision, in which engageable portions of a housing are in contact with edges of holes in a sheet so as to put the sheet into engagement with the engageable portions with certainty, and thus the sheet is prevented from being wobbled or ruptured to suppress faults from occurring.

A display apparatus according to an embodiment of the present invention includes a rectangular display panel including a screen in front; a rectangular sheet located behind the display panel, the sheet having a plurality of holes in a peripheral portion thereof; a light source illuminating the display panel with light from behind the display panel; and a housing accommodating the light source, the housing having a plurality of engageable portions provided in a peripheral portion thereof, the plurality of engageable portions capable of engaging respectively with edges of the plurality of holes. The plurality of engageable portions are adjustable in position or orientation so as to contact the edges of the plurality of holes.

According to an embodiment of the present invention, in the case where an engageable portion is deviated from the edge of the hole due to the warp, the error or the like of the peripheral portion of the housing, the position or orientation of the engageable portion may be adjusted, so that the engageable portion is put into contact with the edge of the hole with certainty and the sheet is put into engagement with the engageable portions. Since the load of the sheet is not concentrated on a part of the engageable portion, the sheet is not ruptured or wobbled, and faults are suppressed from occurring. Thus, the display apparatus may be assembled with high precision.

In the display apparatus according to an embodiment of the present invention, the plurality of holes are larger than the plurality of engageable portions.

According to an embodiment of the present invention, the orientation of the engageable portion may be changed in a state where the engageable portion is present in the hole, so that the engageable portion is put into contact with the edge of the hole, without detaching the engageable portion, namely, with no change in the position of the engageable portion in a height direction of the hole.

In the display apparatus according to an embodiment of the present invention, the plurality of engageable portions each include a flat plate-like contact portion and a shaft portion vertically provided at one end of a surface of the contact portion; the peripheral portion of the housing has a hole into which the shaft portion is allowed to be fit; and the contact portion is rotatable in a state where the shaft portion is fit into the hole.

According to an embodiment of the present invention, the contact portion may be rotated in a state where the shaft portion is fit into the hole. Thus, the orientation of the engageable portion is easily changed to put the engageable portion into contact with the edge of the hole.

In the display apparatus according to an embodiment of the present invention, the engageable portions each include a protruding portion vertically provided at another end of the surface of the contact portion; and the peripheral portion has a plurality of holes into which the protruding portion is allowed to be fit.

According to an embodiment of the present invention, the protruding portion may be fit into an appropriate hole. Thus, the inclining angle of the engageable portion is easily changed to secure the engageable portion to the peripheral portion with certainty.

In the display apparatus according to an embodiment of the present invention, the contact portion has a bullet-like planar shape or a polygonal planar shape.

In the case where the contact portion has a bullet-like planar shape, the engageable portion may be moved to be put into contact with the edge of the hole easily.

In the case where the contact portion has a polygonal planar shape, the engageable portion contacts the edge of the hole along a "line", not at a "point". Therefore, the load of the sheet is dispersed, and the sheet is more suppressed from being ruptured.

In the display apparatus according to an embodiment of the present invention, the engageable portions each include a parallelepiped contact portion and an elliptical plate-like contact portion overlapping the support portion in a state where a longer-diameter direction of the contact portion matches a longitudinal direction of the support portion; the plurality of engageable portions each include triangular prims-shaped protruding portions provided at both of two ends of the support portion in the longitudinal direction thereof; and the peripheral portion of the housing includes a plurality of fitting portions into which the support portion and the protruding portions are allowed to fit, the plurality of fitting portions being aligned in a width direction of the peripheral portion.

According to an embodiment of the present invention, the support portion and the protruding portion may be fit into the fitting portion at an appropriate position. Thus, the position of the contact portion is easily changed to put the contact portion into contact with the edge of the hole.

The display apparatus according to an embodiment of the present invention further includes a rectangular light guide plate or diffuser plate outputting light incident thereon from the light source toward a rear surface of the display panel. The sheet is an optical sheet located between the display panel and the light guide plate or the diffuser plate.

According to an embodiment of the present invention, the optical sheet having the peripheral portion matched to the peripheral portion of the housing so as to be suspended from the housing is not wobbled or ruptured. Thus, the display apparatus is assembled with high precision.

According to an embodiment of the present invention, the position or orientation of the plurality of engageable portions is adjustable such that the plurality of engageable portions contact the edges of the holes. Therefore, in the case where an engageable portion is deviated from the edge of the hole, the position or orientation of the engageable portion may be adjusted to put the engageable portion into contact with the edge of the hole with certainty. Thus, the sheet is engaged with the engageable portions. Since the load of the sheet is not concentrated on a part of the plurality of engageable portions, the sheet is not wobbled or ruptured, and faults are suppressed from occurring. Therefore, the display apparatus may be assembled with high precision.

DETAILED DESCRIPTION

Embodiment 1

Figure 1:
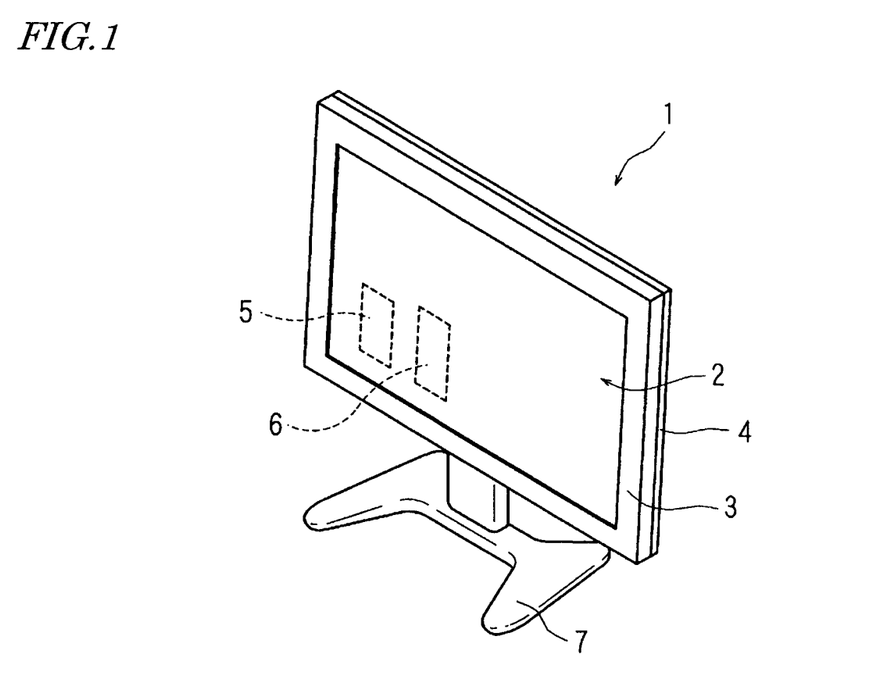
FIG. 1 is an external isometric view of a TV receiver including a display apparatus (display module) in embodiment 1 according to an embodiment of the present invention, as seen from the front side thereof.
Figure 2:
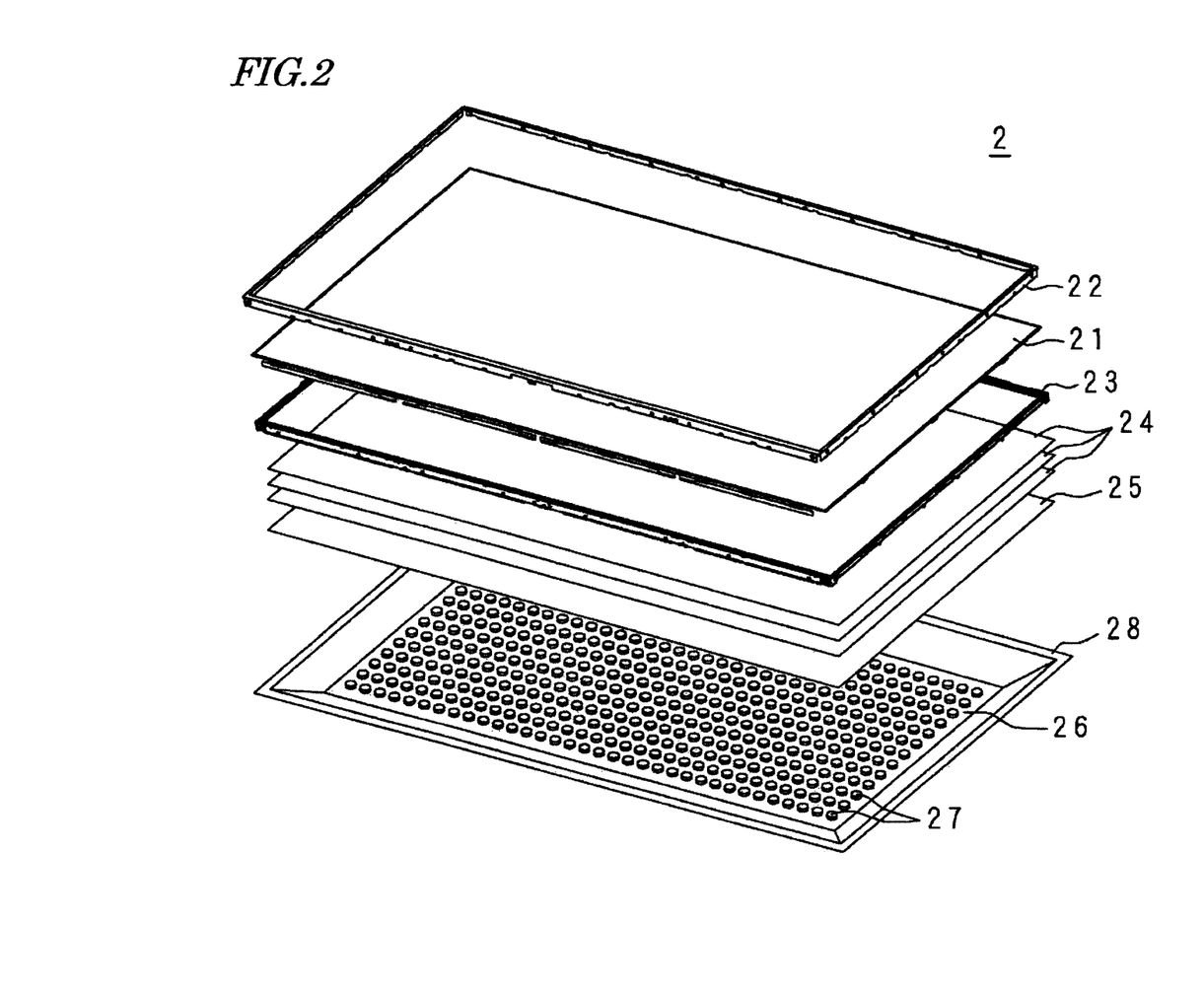
FIG. 2 is an exploded isometric view of the display module.
Figure 3A:
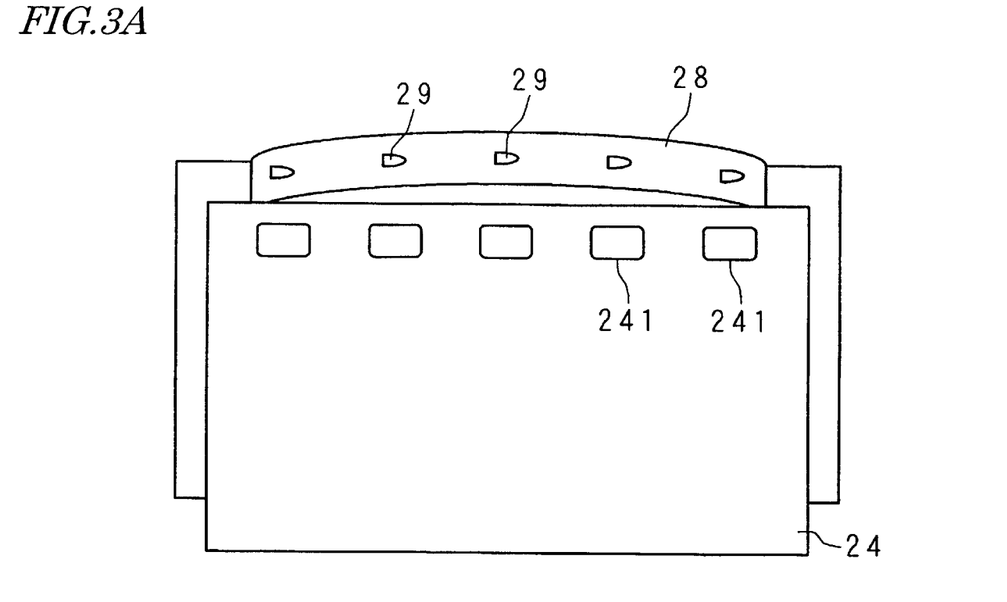
FIG. 3A is a schematic side view showing an opening edge portion of a BL chassis and an optical sheet.
Figure 3B:
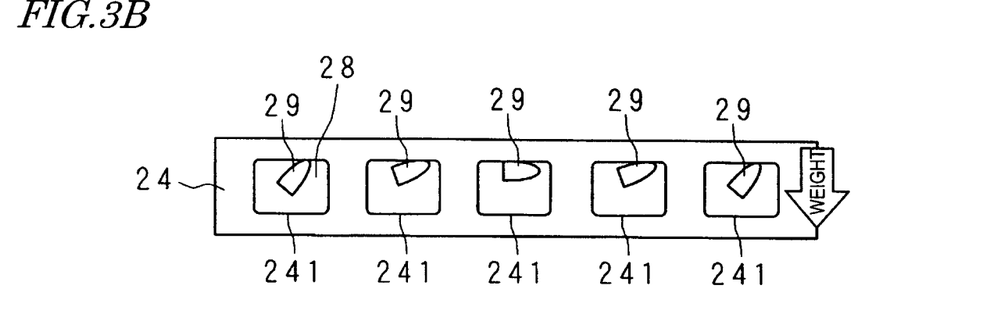
FIG. 3B is a partial enlarged view showing a state where engageable portions are engaged with edges of holes.
Figure 4A:
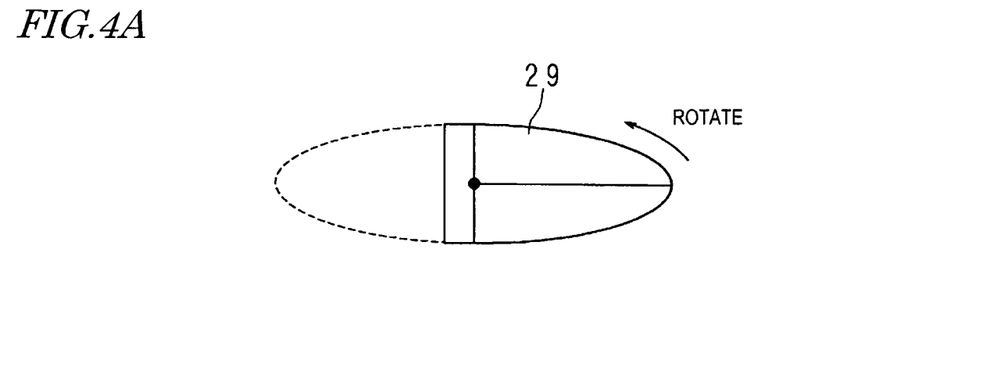
FIG. 4A is a plan view of an engageable portion.
Figure 4B:
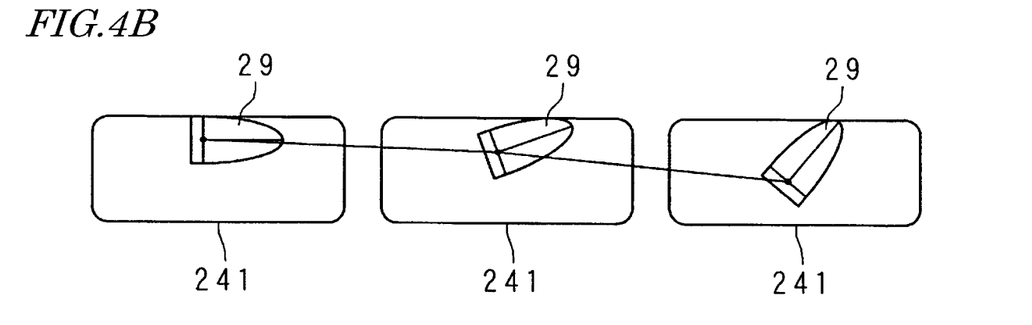
FIG. 4B is a schematic side view showing a state where the engageable portions are engaged with the holes.
Figure 5A:
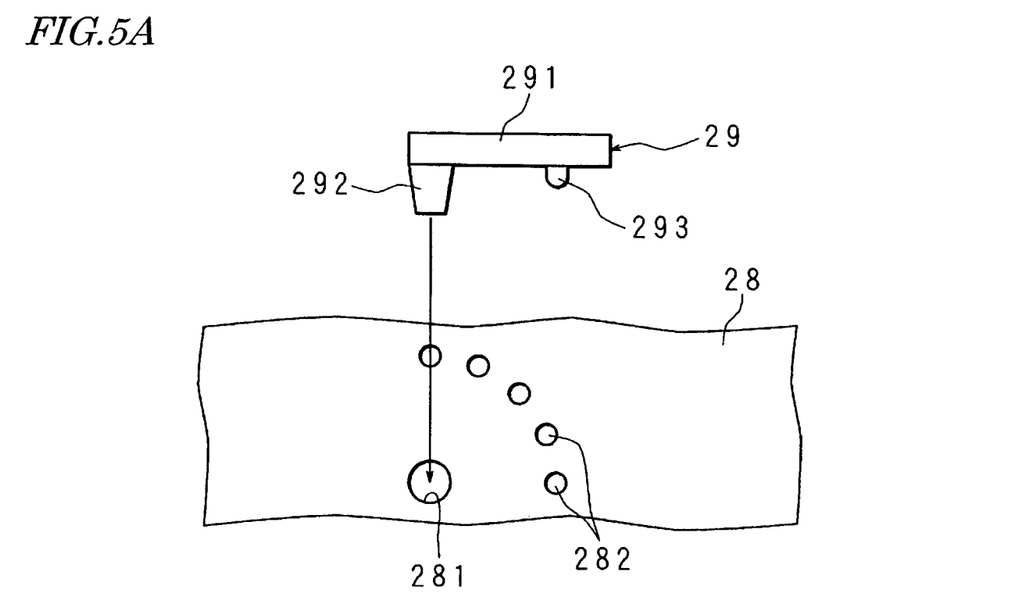
FIG. 5A shows a side view of the engageable portion and a partial side view of the BL chassis.
Figure 5B:
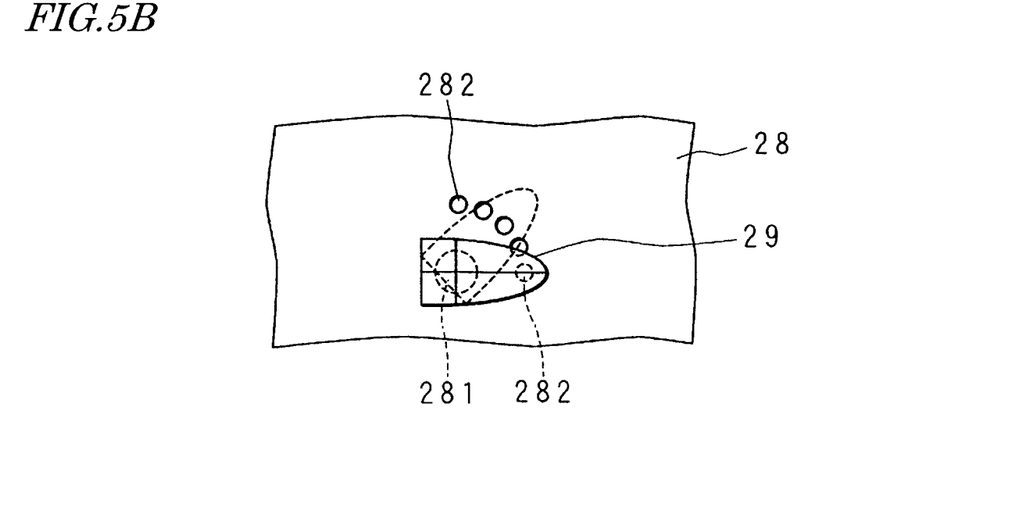
FIG. 5B shows how the engageable portion is rotated.

FIG. 1 is an external isometric view of a TV receiver 1 including a display apparatus (display module) 2 in embodiment 1 according to an embodiment of the present invention, as seen from a front side. FIG. 2 is an exploded isometric view of the display module 2. FIG. 3A is a schematic side view showing an opening edge portion of a BL chassis 28 and an optical sheet 24, and FIG. 3B is a partial enlarged view thereof showing a state where engageable portions 29 are respectively engaged with edges of holes 241. FIG. 4A is a plan view of an engageable portion 29. FIG. 4B is a schematic side view showing a state where the engageable portions 29 are engaged with the holes 241. FIG. 5A show a side view of the engageable portion 29 and a partial side view of the BL chassis 28. FIG. 5B shows how the engageable portion 29 is rotated.

The TV receiver 1 is longer in a lateral direction, and includes the display module 2 including a display panel 21 displaying a video image, a tuner 5 receiving broadcast waves from an antenna (not shown), and a decoder 6 decoding encoded broadcast waves. The TV receiver 1 decodes, by the decoder 6, the broadcast waves received by the tuner 5, and displays a video image on the display module 2 based on the decoded information. Below the TV receiver 1, a stand 7 supporting the TV receiver 1 is provided.

The display module 2 is accommodated in a standing state between a front cabinet 3 and a rear cabinet 4, both of which are located in a standing state. The front cabinet 3 is a rectangular frame covering a peripheral portion of the display module 2, and has a rectangular opening at a center thereof. The front cabinet 3 is formed of, for example, a synthetic resin. The rear cabinet 4 has a shape of a rectangular tray opened forward, and is formed of, for example, a synthetic resin. The front cabinet 3 and the rear cabinet 4 may be formed of another material.

The front cabinet 3 and the rear cabinet 4 are substantially the same as each other in the top side length, the bottom side length, the left side length and the right side length. Peripheral edges of the front cabinet 3 and the rear cabinet 4 face each other. A peripheral portion of the display panel 21 faces an inner edge portion of the front cabinet 3.

As shown in FIG. 2, the display module 2 includes the display panel 21, a bezel 22, a panel chassis 23, three, for example, optical sheets 24, a diffuser plate 25, a reflector sheet 26, diffuser lenses (each having a built-in LED) 27, and a BL chassis 28.

The BL chassis 28 is formed of, for example, a metal material such as aluminum or the like, and has a generally box-like shape opened toward a light output side (toward the display panel 21).

On a bottom surface of the BL chassis 28, a plurality of LED substrates (not shown) each including an LED and the diffuser lens 27 covering the LED are provided. The reflective sheet 26 is placed on the LED substrates such that the lenses 27 are exposed.

The diffuser plate 25 is located with a small gap from the diffuser lenses 27. On the diffuser plate 25, the optical sheets 24 are located.

A backlight unit includes the optical sheets 24, the diffuser plate 25, the reflector sheet 26, the LED substrates, and the BL chassis 28. The backlight unit used in this embodiment is of a direct type.

The panel chassis 23 is frame-like, and is located along an outer edge of the BL chassis 28. The panel chassis 23 and the BL chassis 28 have therebetween, and hold, peripheral portions of the optical sheets 24.

The display panel 21 includes a color filter substrate including a plurality of color filters, an active matrix substrate (TFT substrate) located to face the color filter substrate and including a plurality of thin film transistors acting as switching elements, and a liquid crystal layer provided as a display medium layer between the color filter substrate and the active matrix substrate.

The bezel 22 is formed of, for example, a metal material having high rigidity such as stainless steel or the like, and is a frame having a U-shaped cross-section. The bezel 22 has the peripheral portion of the display panel 21, the panel chassis 23, the peripheral portions of the optical sheets 24, and the opening edge portion of the BL chassis 28 held between two ends of the U-shape.

As shown in FIG. 3A, a plurality of engageable portions 29 are located in a longitudinal direction in a top side portion of the opening edge portion of the BL chassis 28.

In a top side portion of each of the optical sheets 24, a plurality of holes 241 are located in correspondence with the engageable portions 29. The holes 241 are rectangular and larger than the engageable portions 29.

As shown in FIG. 4A, the engageable portions 29 each have a planar shape that may be obtained as a result of vertically cutting an elliptical shape longer in the lateral direction so as to have an area size slightly larger than half of the elliptical shape, namely, each have a shape of a bullet. If the planar shape of the engageable portion 29 is elliptical, when the engageable portion 29 is rotated as described below, a portion of the engageable portion 29 that is opposite to a portion contacting a top edge of the hole 241 contacts a bottom edge of the hole 241. Therefore, such an opposite portion needs to be cut away.

As shown in FIG. 5A, the engageable portion 29 includes a flat plate-like contact portion 291 having a bullet-like planar shape, a shaft portion 292 provided at one end of a rear surface of the contact portion 291, and a protruding portion 293 provided at another end of the rear surface of the contact portion 291 and having a spherical shape as seen in a plan view. The shaft portion 292 is tapered so as to be thinner at a tip thereof, and is longer than the protruding portion 293. The contact portion 291 does not need to have a flat surface and may have a curved surface.

A first fitting hole 281, into which the shaft portion 292 is allowed to be fit, is provided in the opening edge portion of the BL chassis 28. A plurality of second fitting holes 282, into which the protruding portion 293 is allowed to be fit, are provided to form an arc shape in the vicinity of the first fitting hole 281.

As shown in FIG. 5B, the shaft portion 292 of the engageable portion 29 is loosely fit into the first fitting hole 281, and the protruding portion 293 of the engageable portion 29 is fit into an appropriate second fitting hole 282 among the plurality of second fitting holes 282 to adjust the angle of the engageable portion 29. In this state, the contact portion 291 is pressed. Thus, the engageable portion 29 is secured to the BL chassis 28.

The engageable portions 29 are aligned in a straight lateral line on the opening edge portion of the BL chassis 28. However, in the case where, as shown in FIG. 3A, the opening edge portion is warped toward the front side, the engageable portions 29 are not aligned in a straight line.

The holes 241 are aligned in a straight lateral line, and are larger than the engageable portions 29. Therefore, in a state where the optical sheets 24 are put on the opening edge portion of the BL chassis 28, such a situation that the engageable portions 29 are not accommodated in the holes 24 is avoided. However, there is at least one engageable portion 29 that is not in contact with the edge of the hole 241. In this case, the load of the optical sheets 24 are concentrated on the engageable portions 29 in contact with the top edges of the holes 241. Therefore, the problem that, for example, the optical sheets 24 are ruptured may occur.

In this embodiment, the at least one engageable portion 29 not in contact with the edge of the hole 241 is arranged as follows. As shown in FIG. 3B, the shaft portion 292 of such an engageable portion 29 is floated (put into a loosely fit state) such that the contact portion 291 thereof contacts the edge, and the contact portion 291 is rotated to fit the protruding portion 293 into an appropriate fitting hole 282 among the plurality of fitting holes 282. Thus, the engageable portion 29 is secured. The engageable portion 29 at the center of FIG. 3B is in contact with the top edge of the hole 241 with no need to rotate the contact portion 291. For the engageable portions 291 on both sides of the engageable portion 29 at the center of FIG. 3B, the protruding portion 293 of each of such engageable portions 291 is fit into the second fitting hole 282 that is second from the bottom in FIG. 5B. For the engageable portions 291 at both of two ends of FIG. 3B, the protruding portion 293 of each of such engageable portions 291 is fit into the second fitting hole 282 that is second from the top in FIG. 5B.

As shown in FIG. 4B, the rotation centers of the engageable portions 29 (centers of the shaft portions 292) are not aligned in a straight line. However, the contact portions 291 are rotated, and as a result, all of the engageable portions 29 contact the top edges of the holes 241.

All of the engageable portions 29 are engaged with the edges of the holes 241. Therefore, the weight (load) of the optical sheets 24 is not concentrated on a part of the engageable portions 29 but is distributed to all the engageable portions 29. Thus, the optical sheets 24 are supported by all the engageable portions 29.

As described above, in this embodiment, in the case where an engageable portion 29 is deviated from the edge of the hole 241 due to the warp or error of the peripheral portion of the BL chassis 28, the inclining angle of the engageable portion 29 may be adjusted, so that the engageable portion 29 is put into contact with the edge of the hole 241 and the optical sheets 24 are put into engagement with the engageable portions 29. Therefore, the optical sheets 24 are not ruptured or wobbled, and faults are suppressed from occurring. Thus, the display module 2 is assembled with high precision.

In this embodiment, the engageable portions 29 each include the shaft portion 292 and the protruding portion 293, whereas the first fitting hole 281 and the second fitting holes 282 are provided in the opening edge portion of the BL chassis 28. The present invention is not limited to this. Neither the protruding portions 293 nor the second fitting holes 282 may be provided. In this case, the shaft portion 292 of each engageable portion 29 may be loosely inserted into the first hole 281, and the inclining angle of the contact portion 291 may be determined such that the contact portion 291 contacts the top edge of the hole 241. Then, the shaft portion 292 may be pressed into the first fitting hole 281 and fit into the first fitting hole 281 with certainty to secure the engageable portion 29. In this case, the inclining angle is adjustable finely.

Alternatively, a plurality of the first fitting holes 281 may be aligned in the opening edge portion of the BL chassis 28 in a width direction. With this structure, even in the case where the holes 241 are not sufficiently larger than the engageable portions 29 and the engageable portions 29 are not accommodated in the holes 241 as a result of, for example, the opening edge being warped, the engageable portions 29 may be inserted into the holes 241 and put into contact with the top edges of the holes 241. In the case where the plurality of second fitting holes 282 are provided in correspondence with the plurality of first fitting holes 281, the position and the angle of the engageable portions 29 are adjustable finely.

The engageable portions 29 are not limited to being provided on the top side portion of the opening edge portion of the BL chassis 28, and the holes 241 are not limited to being provided in the top side portion of the optical sheets 24. The engageable portions 29 and the holes 241 may be provided on and in, for example, a left edge portion and a right edge portion of the BL chassis 28 and the optical sheets 24.

The engageable portions 29 are not limited to being provided on the opening edge portion of the BL chassis 28, and may be provided on a peripheral area other than the opening edge portion of the BL chassis 28.

Embodiment 2

A display apparatus in embodiment 2 according to an embodiment of the present invention has substantially the same structure as that of the display apparatus in embodiment 1 except for the shape of the engageable portions 29.

Figure 6A:
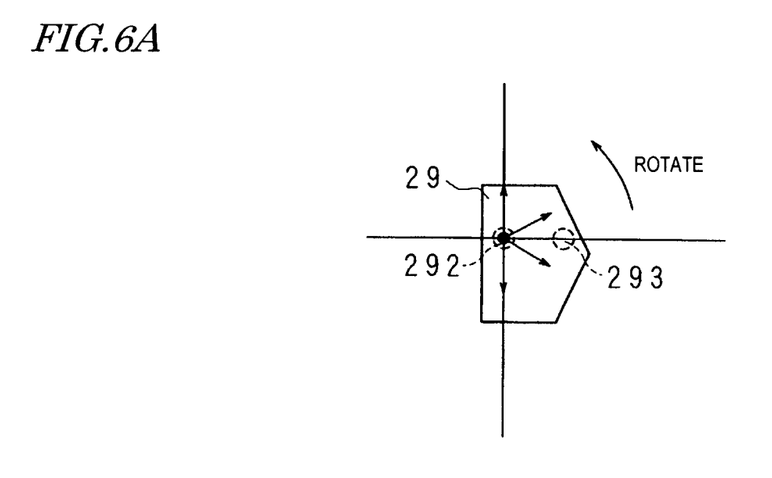
FIG. 6A is a plan view of an engageable portion in embodiment 2 according to an embodiment of the present invention.
Figure 6B:
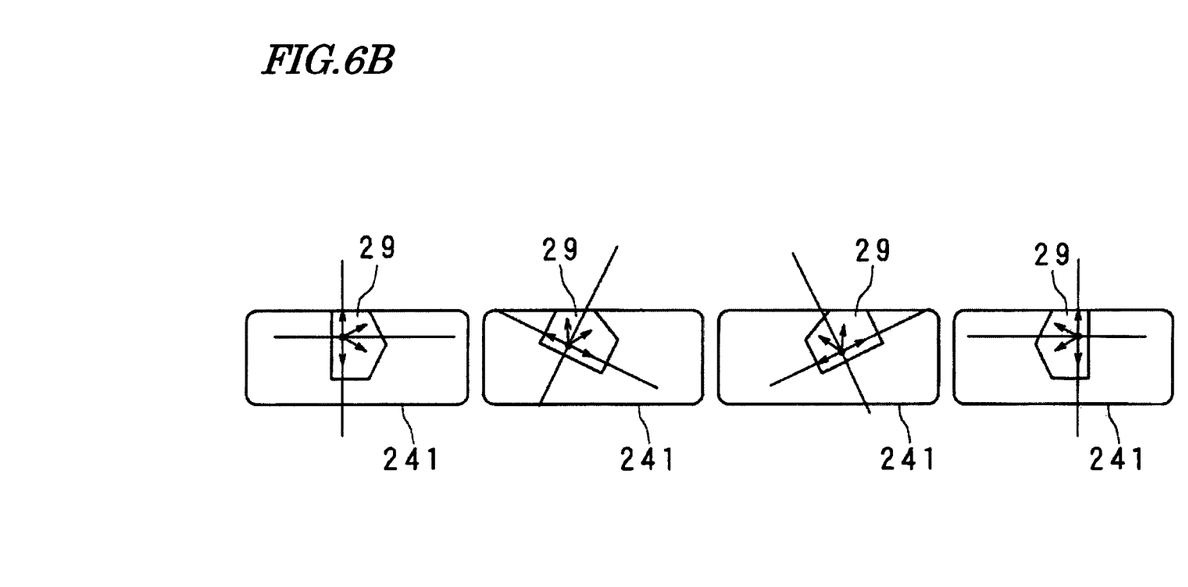
FIG. 6B is a schematic side view showing a state where engageable portions are engaged with the holes.

FIG. 6A is a plan view of an engageable portion 29 in embodiment 2 according to an embodiment of the present invention. FIG. 6B is a schematic side view showing a state where such engageable portions 29 are respectively engaged with the holes 241.

The contact portion 291 of each engageable portion 29 has a pentagonal planar shape.

The shaft portion 292 like that in embodiment 1 is provided on a rear surface of the contact portion 291, at a position that is close to the center of the longest side thereof. The protruding portion 293 is provided in the lateral direction from the shaft portion 292.

Like in embodiment 1, the first fitting hole (not shown) into which the shaft portion 292 is allowed to be fit, and the second fitting holes (not shown) into which the protruding portion 293 is allowed to be fit, are provided in the opening edge portion of the BL chassis 28.

The second fitting holes are each located at a position at which, when the shaft portion 292 is fit into the first fitting hole 291, the contact portion 291 is rotatable as shown in FIG. 6B such that each of sides of the contact portion 291 contacts the top edge of the hole 241.

As shown in FIG. 6B, the contact portion 291 of each engageable portion 29 is in contact with the top edge of the hole 241 along a "line", not at a "point". Therefore, the load of the optical sheets 24 is dispersed, and are more difficult to be ruptured.

Embodiment 3

A display apparatus in embodiment 3 according to an embodiment of the present invention has substantially the same structure as that of the display apparatus in embodiment 1 except for the shape of the engageable portions 29.

Figure 7A:
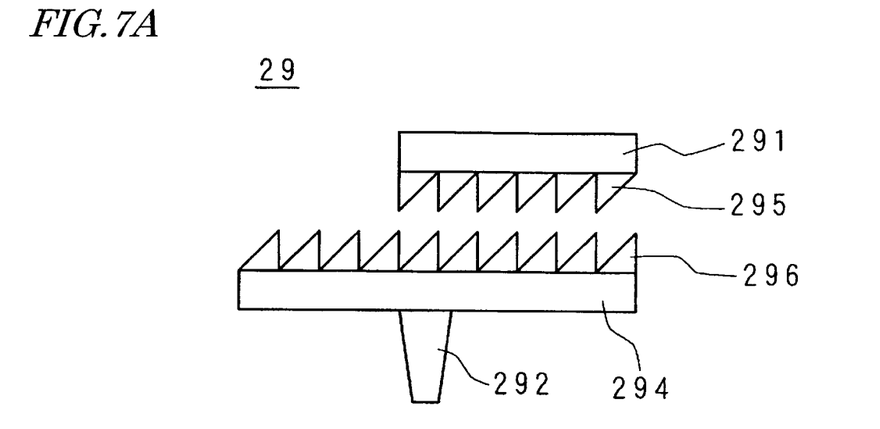
FIG. 7A is a side view of an engageable portion.
Figure 7B:
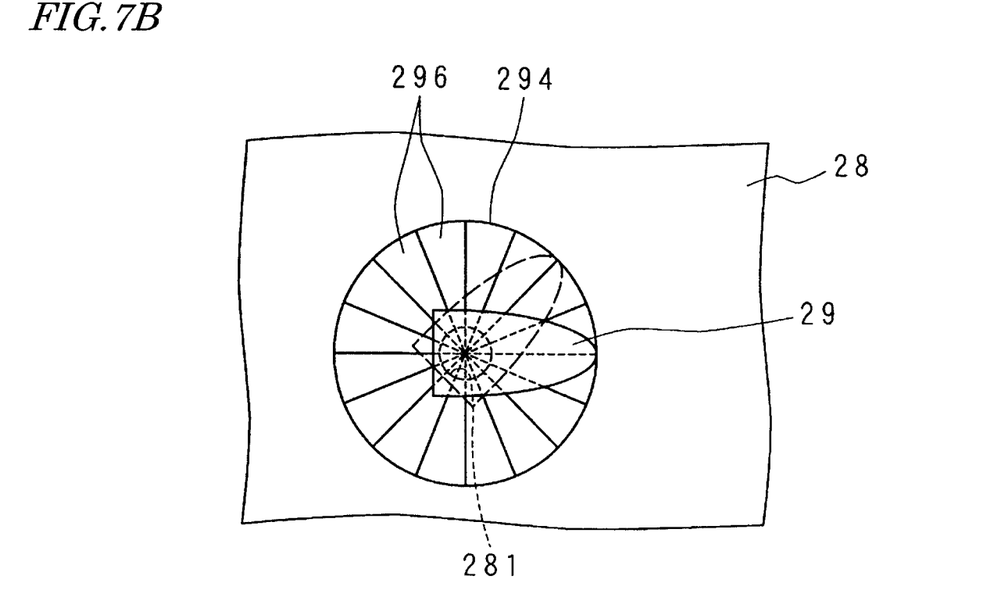
FIG. 7B is a plan view showing a state where the engageable portion is attached to the opening edge portion of the BL chassis.

FIG. 7A is a side view of an engageable portion 29. FIG. 7B is a plan view showing a state where the engageable portion 29 is attached to the opening edge portion of the BL chassis 28.

The engageable portion 29 includes a contact portion 291, a positioning portion 294, and a shaft portion 292. The contact portion 291 has a bullet-like planar shape like the contact portion 291 in embodiment 1. The contact portion 291 has a gear groove 295 formed in a bottom surface thereof, and the positioning portion 294 has a gear groove 296 formed in a top surface thereof. The gear groove 295 of the contact portion 291 and the gear groove 296 of the positioning portion 294 are shaped such that the contact portion 291 is rotatable in one direction with respect to the positioning portion 294 but is not rotatable in the opposite direction.

Like in embodiment 1, the first fitting hole 281, into which the shaft portion 292 is allowed to be fit, is provided in the opening edge portion of the BL chassis 28.

In this embodiment, the shaft portion 292 is fit into the first fitting hole 281 to secure the positioning portion 284 on the opening edge portion of the BL chassis 28.

After the position of the positioning portion 294 is determined, the contact portion 291 is fit into the positioning portion 294 and secured.

In this embodiment, the contact portion 291 may be inclined leftward and also rightward in FIG. 7B to put the contact portion 291 into contact with the top edge of the hole 241.

Embodiment 4

A display apparatus in embodiment 4 according to an embodiment of the present invention has substantially the same structure as that of the display apparatus in embodiment 1 except for the shape of the engageable portions 29.

Figure 8A:
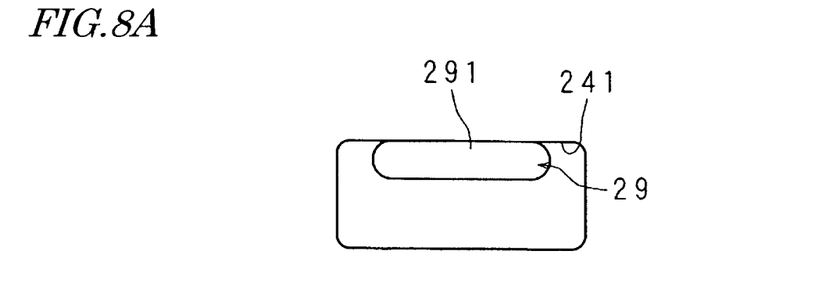
FIG. 8A is a schematic side view of an engageable portion and a hole.
Figure 8B:
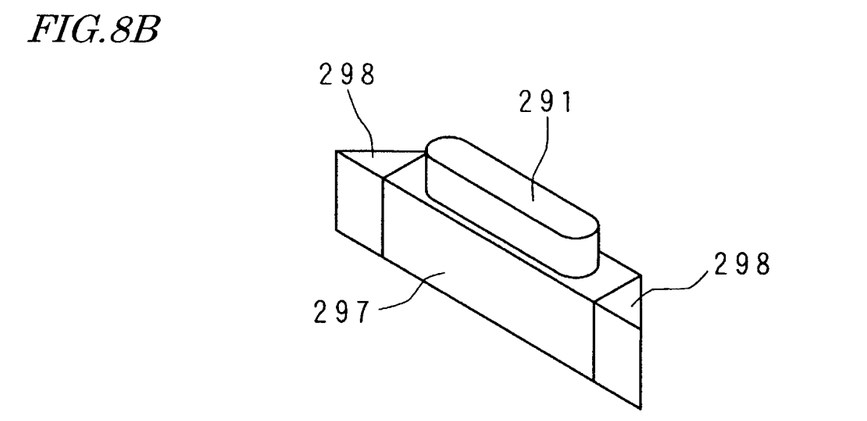
FIG. 8B is an isometric view of the engageable portion.
Figure 8C:
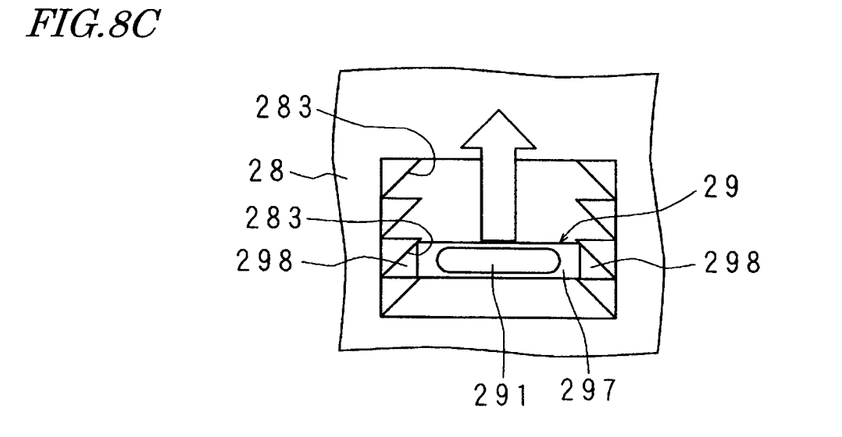
FIG. 8C is a schematic side view showing a structure attaching the engageable portion.

FIG. 8A is a schematic side view showing an engageable portion 29 and the hole 241. FIG. 8B is an isometric view of the engageable portion 29. FIG. 8C is a schematic side view showing a structure attaching the engageable portion 29.

The engageable portion 29 in this embodiment includes a support portion 297 having a parallelepiped shape, and a contact portion 291 having an elliptical plate-like shape and provided to overlap the support portion 297 in a state where a longer-diameter direction of the contact portion 291 matches a longitudinal direction of the support portion 297. At both of two ends of the support portion 297 in the longitudinal direction, triangular prism-shaped protruding portions 298 are provided.

As shown in FIG. 8C, four fitting holes 283 are aligned in an up-down direction in the opening edge portion of the BL chassis 28. The fitting holes 283 each have a shape of the planar shape of the support portion 297 and the planar shapes of the protruding portions 298 combined. The support portion 297 and the protruding portions 298 are fit into one of the fitting holes 283 at an appropriate position, so that the position of the contact portion 291 protruding from the fitting hole 283 is changed in four steps in the up-down direction.

Therefore, in the case where the opening edge portion of the BL chassis 28 is, for example, warped and thus the contact portion 291 does not contact the top edge of the hole 241, the position of the support portion 297 may be changed in the up-down direction to put the contact portion 291 into contact with the top edge of the hole 241 as shown in FIG. 8A.

Embodiment 5

A display apparatus in embodiment 5 according to an embodiment of the present invention includes an edge-type backlight unit.

Figure 9:
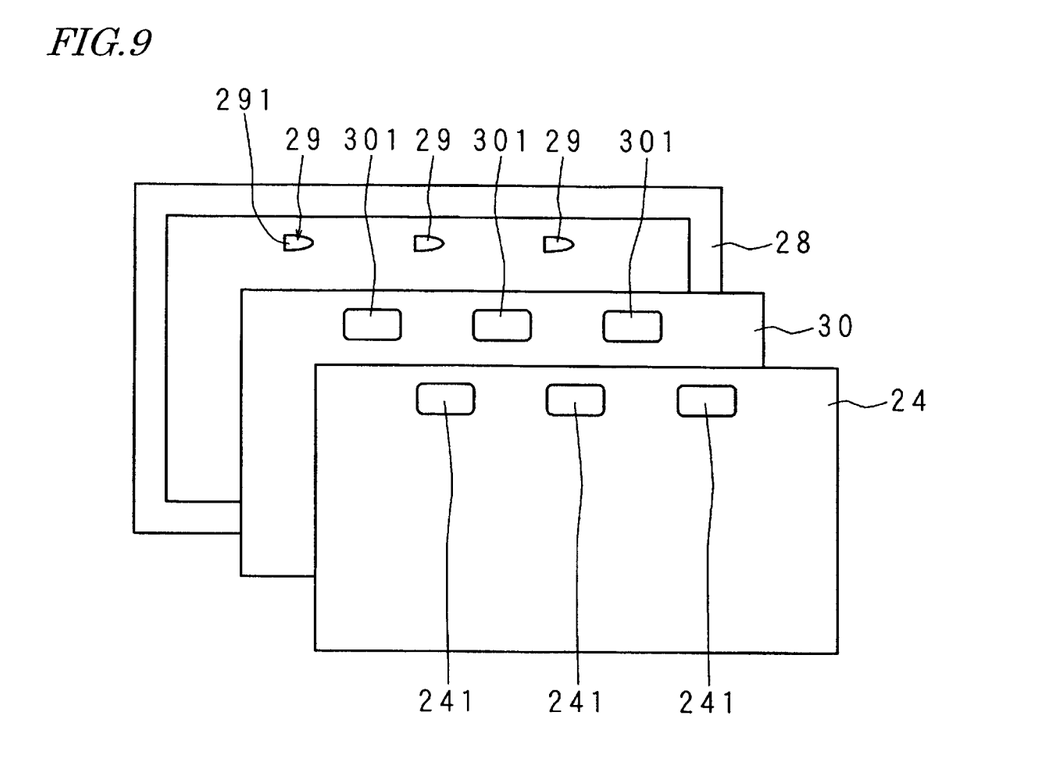
FIG. 9 is a schematic side view showing the optical sheet, a light guide film and the BL chassis.

FIG. 9 is a schematic side view showing the optical sheet 24, a light guide film 30 and the BL chassis 28. In FIG. 9, the display panel 21 is omitted.

The display apparatus in this embodiment includes a plurality of engageable portions 29 provided on a top edge portion of the BL chassis 28. The engageable portions 29 have substantially the same structure as that of the engageable portions 29 in embodiment 1.

The display apparatus in this embodiment includes the light guide film 30, which is thin. The light guide film 30 and the optical sheet 24 respectively have holes 301 and 241 engageable with the engageable portions 29.

In the top edge portion of the BL chassis 28, the first fitting hole 281 and the second fitting holes 282 are provided.

In the case where the top edge portion of the BL chassis 28 is warped toward the front side, the engageable portions 29 are not aligned in a straight line.

The holes 241 and 301 are aligned in a straight lateral line, and are larger than the engageable portions 29. Therefore, in a state where the light guide film 30 and the optical sheet 24 are put on the top edge portion of the BL chassis 28, such a situation that the engageable portions 29 are not accommodated in the holes 301 or 241 is avoided. However, there are at least one engageable portion 29 that is not in contact with a top edge of the hole 301 or a top edge of the hole 241.

In this case, like in embodiment 1, the protruding portion 293 (not shown) of such an engageable portion 29 is fit into an appropriate second fitting hole 282 among the plurality of second fitting holes 282 in a state where the shaft portion 292 (not shown) of the engageable portion 29 is fit into the first fitting hole 281, and the contact portion 291 is rotated. Thus, the contact portion 291 is put into contact with the top edges of the hole 301 and the hole 241.

Embodiments 1 through 5 disclosed above are examples in all the aspects and should not be construed as limiting the present invention in any way. It is intended that the scope of the present invention is not limited to any of the above-described embodiments and encompasses the equivalents of the claims and all the modifications in the scope of the claims.

For example, the structures of the engageable portions 29 of the BL chassis 28 and the optical sheets 24 in embodiments 1 through 4 are applicable to a display apparatus including an edge-type backlight unit.

What is claimed is:

1. A display apparatus, comprising:
   a rectangular display panel including a screen in front;
   a rectangular sheet located behind the display panel, the sheet having a plurality of holes in a peripheral portion thereof;
   a light source illuminating the display panel with light from behind the display panel; and
   a housing accommodating the light source, the housing that has a generally box-like shape having a rectangular opening toward the display panel, and has a plurality of engageable portions arranged along a longitudinal direction in a peripheral portion of the rectangular opening, the plurality of engageable portions capable of engaging respectively with edges of the plurality of holes;
   wherein the plurality of engageable portions are adjustable in position or orientation so as to contact the edges of the plurality of holes.

2. The display apparatus according to claim 1, wherein in a standing state where the plurality of engageable portions are situated upward, the sheet is supported by all the plurality of engageable portions.

3. The display apparatus according to claim 1, wherein the plurality of holes are larger than the plurality of engageable portions.

4. The display apparatus according to claim 1, wherein:
the plurality of engageable portions each include a flat plate-like contact portion and a shaft portion vertically provided at one end of a surface of the contact portion;
the peripheral portion of the housing has a hole into which the shaft portion is allowed to be fit; and
the contact portion is rotatable in a state where the shaft portion is fit into the hole.

5. The display apparatus according to claim 4, wherein:
the plurality of engageable portions each include a protruding portion vertically provided at another end of the surface of the contact portion; and
the peripheral portion of the housing has a plurality of holes into which the protruding portion is allowed to be fit.

6. The display apparatus according to claim 4, wherein the contact portion has a bullet-like planar shape or a polygonal planar shape.

7. The display apparatus according to claim 1, wherein:
the plurality of engageable portions each include a parallelepiped contact portion and an elliptical plate-like contact portion overlapping the support portion in a state where a longer-diameter direction of the contact portion matches a longitudinal direction of the support portion;
the plurality of engageable portions each include triangular prism-shaped protruding portions provided at both of two ends of the support portion in the longitudinal direction thereof; and
the peripheral portion of the housing includes a plurality of fitting portions into which the support portion and the protruding portions are allowed to fit, the plurality of fitting portions being aligned in a width direction of the peripheral portion of the housing.

8. The display apparatus according to claim 1, further comprising a rectangular light guide plate or diffuser plate outputting light incident thereon from the light source toward a rear surface of the display panel;
wherein the sheet is an optical sheet located between the display panel and the light guide plate or the diffuser plate.

* * * * *